United States Patent [19]
Kondo

[11] Patent Number: 4,874,516
[45] Date of Patent: Oct. 17, 1989

[54] A CERAMIC FILTER FOR SEMI-ULTRAFILTRATION

[75] Inventor: Kuniharu Kondo, Nagoya, Japan

[73] Assignee: NGK Insulators, Ltd., Nagoya, Japan

[21] Appl. No.: 812,056

[22] Filed: Dec. 23, 1985

[30] Foreign Application Priority Data

Dec. 29, 1984 [JP] Japan ................................ 59-279080

[51] Int. Cl.⁴ .............................................. B01D 13/00
[52] U.S. Cl. ................... 210/490; 210/497.01;
210/500.21; 210/500.27; 210/500.36;
210/500.42; 210/506; 210/510.1
[58] Field of Search ............. 210/490, 500.21, 500.27,
210/500.36, 500.42, 506, 158, 497.01, 510.1

[56] References Cited

U.S. PATENT DOCUMENTS

| | | | |
|---|---|---|---|
| 3,508,994 | 4/1970 | Nyrop | 210/500.3 |
| 3,629,087 | 12/1971 | Rubin | 204/181.6 |
| 3,657,402 | 4/1972 | Stana et al. | 264/45.1 |
| 3,878,104 | 4/1975 | Guerrero | 210/510.1 |
| 3,914,358 | 10/1975 | Dixon et al. | 210/490 X |
| 4,077,885 | 3/1978 | van Heuven et al. | 210/500.21 |
| 4,214,020 | 7/1980 | Ward et al. | 210/500.21 |
| 4,230,463 | 10/1980 | Henis et al. | 55/158 |
| 4,346,126 | 8/1982 | Kutowy et al. | 427/209 |
| 4,594,079 | 6/1986 | Yamamoto et al. | 55/158 |

FOREIGN PATENT DOCUMENTS

| | | |
|---|---|---|
| 0139806 | 8/1985 | European Pat. Off. . |
| 2820057 | 11/1979 | Fed. Rep. of Germany . |
| 59-225716 | 12/1984 | Japan . |
| 2072047 | 9/1981 | United Kingdom . |

*Primary Examiner*—W. Gary Jones
*Attorney, Agent, or Firm*—Arnold, White & Durkee

[57] ABSTRACT

This invention relates to a filter which includes a substrate of a ceramic porous material of a high strength, which serves as a support, covered with a microporous membrane of a polymer, typically a fluorocarbon polymer, partly permeating the surface layer of the substrate and acting as a filter for fine particles. The filter exhibits excellent corrosion-resistance, durableness and heat-resistance and is used for semi-ultrafiltration such as filtration for sterilization, purification of crystals and the like.

9 Claims, 1 Drawing Sheet

A CERAMIC FILTER FOR SEMI-ULTRAFILTRATION

BACKGROUND OF THE INVENTION

1. Field of the Invention

The present invention relates to a filter to be employed for filtration of fine substances such as filtration for sterilization, purification of crystals and the like (such filtration as the above will be referred to as "Semi-ultrafiltration" hereinafter), and to a process for manufacturing the same.

2. Related Art Statement

As conventional filters, there are known ceramic filters formed of sintered fine ceramic particles or a porous sintered ceramic material having its surface covered with fine ceramic particles, as shown in Japanese Patent Application Publication No. 8,643/81, or membrane filters comprising a filter membrane of a resinous material.

While ceramic filters are excellent in corrosion-resistibility and durability, such filters put to use have generally a limited pore size of about $0.8\mu$ at the smallest from restrictions of the starting particle size and sintering conditions. Accordingly, ceramic filters are not employable for semi-ultrafiltration such as filtration for sterilization, purification of crystals and the like, so that their uses are extremely limited.

In contrast with the above, membrane filters, as represented by those of polytetrafluoroethylene, can be provided with micropores of a pore size as small as about $0.1\mu$. These membrane filters exhibit an improved durability and therefore are suitable for the semi-ultrafiltration. However, membrane filters possess a relatively small tensile strength per unit area as compared with ceramics or metals and soften as the ambient temperature is raised, thus resulting in the loss of tensile strength. Further, if being placed under a tensile stress even at a temperature lower than the melting point temperature of the membrane for a long period of time, the membrane will undergo a large thermal transformation. The thermal transformation causes the membrane to undergo creep which results in a permanent deformation, thus causing its pore size to change, and therefore, will be inconvenient to utilize by regeneration.

SUMMARY OF THE INVENTION

The present invention has as its object to provide, by developing only advantages of the aforementioned known ceramic filters and membrane filters, an improved filter having excellent corrosion-resistance, durableness and heat-resistance which can be used repeatedly by applying back-washing regeneration and is adapted for the semi-ultrafiltration.

Another object of the present invention is to provide a manufacturing process to enable such an improved filter to be readily produced.

A filter according to the present invention is characterized by comprising a substrate consisting substantially of a ceramic porous material and a microporous membrane consisting substantially of a high polymeric resinous material having an average pore size smaller than that of the ceramic porous material. The microporous membrane covers at least one surface of said substrate, wherein the membrane partly permeates the surface layer of the substrate.

Further, a process for manufacturing the filter of the invention is characterized by applying a suspension of a high polymeric resinous material onto at least one surface of a substrate consisting substantially of a ceramic porous material. The membrane is applied at a thickness smaller than that of the substrate and in such a manner that a part of the suspension is allowed to permeate the surface layer of the substrate. The suspension-applied substrate is then subjected to a heat-treatment to form a microporous membrane of the high polymeric resinous material having an average pore size smaller than that of the ceramic porous material. The membrane covers at least one surface of said substrate, wherein it partly permeates the surface layer of the substrate.

In such a filter, the substrate comprising a ceramic porous material serves as a support material or base material. Accordingly, the mechanical strength of the filter naturally depends upon the strength of the ceramic porous material. Moreover, the microporous membrane acts as a filter membrane. In the case where the microporous membrane is formed of a fluorocarbon resin, its pore size can be made sufficiently small. Moreover, since the base material is also a porous body, a part of the membrane resin permeates into pores in the surface layer of the base material, thereby forming a firm mechanical bond at their intermingled portion to give an extremely strong adhesion.

BRIEF DESCRIPTION OF THE DRAWINGS

Some embodiments of the invention will now be described by way of example and with reference to the accompanying drawings in which.

DESCRIPTION OF THE PREFERRED EMBODIMENTS

Figure 1:
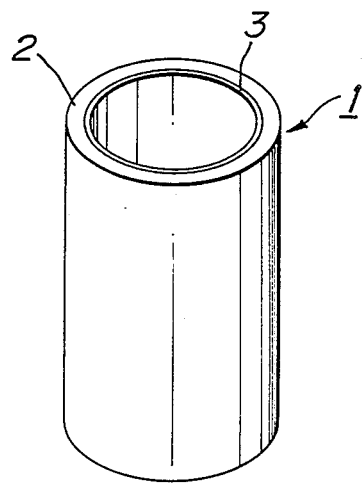
FIG. 1 is a perspective view of an embodiment of the present invention.

In FIG. 1, the filter 1 comprises a cylindrical substrate 2 formed of a ceramic porous material having an interior wall covered with microporous membrane 3 of a fluorocarbon resin, a part of which permeates the surface layer of the interior wall.

The filter 1 of the present invention can be prepared in accordance with the following process.

Figure 2:
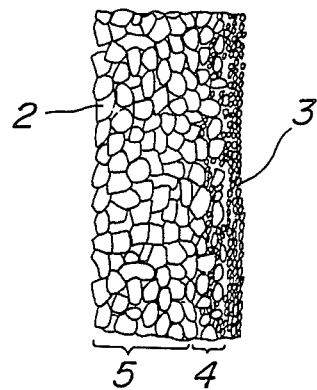
FIG. 2 is an enlarged sectional view of a principal part of the embodiment shown in FIG. 1.

First of all, ceramic particles comprising, for example, silica sand, porcelain particles, alumina or the like, having an average particle size of about 0.2-2 mm are molded together with an inorganic bonding agent, such as glass, into a cylindrical shape. The resulting mold is heated to provide a substrate 2 having an average pore size of about $0.5-10\mu$ and a pore volume of about 30-50% based on the apparent volume of the substrate. As a matter of course, the substrate 2 may be formed from a ceramic foamed material. The interior wall surface of the substrate 2 is covered, by any conventional means such as spraying, brushing, etc., with a thickness above the surface of the substrate of about $30-500\mu$, with a suspension prepared by adding a solvent such as alcohol and the like to a fluorocarbon resin such as polytetrafluoroethylene (PTFE), tetrafluoroethylene/-hexafluoropropylene copolymer (FEP), tetrafluoroethylene/perchloroalkylvinylether copolymer (PFA), polychlorotrifluoroethylene (PCTFE), polyvinylidifluoride (PVDF) and the like, and then agitating the mixture. Further, the suspension-applied substrate is allowed to stand for about 1 hour or heated at a relatively low temperature to gradually evaporate the solvent and to coagulate the resin while a portion of the suspension is allowed to permeate the surface of the substrate, Thereafter the suspension-applied substrate is heated at an appropriate high temperature dependent on the resin, for example, about 320° C.–360° C. for PTFE, FEP and PFA; about 200° C.–250° C. for PCTFE; and about 170° C.–200°C. for PVDF, for 1 hour or more, to melt the resin. Thus, the molten resin is formed into a membrane, a part of which permeates the surface layer of the interior wall of the substrate 2, and as shown in FIG. 2, the filter 1 is provided with a three-layered structure consisting of microporous membrane 3 and substrate 2 comprising a porous ceramic layer 5 and an intermediary layer 4 composed of the intimately intermingled resin with the ceramic substrate 2. Further, it should be appreciated that a preferable thickness of the microporous membrane after having been melted by heating is between about $30\mu$ and about $500\mu$. If the membrane is smaller than about $30\mu$, the thickness may be apt to be uneven and accordingly, a variance of the pore size becomes too great to effect a uniform semi-ultrafiltration. On the other hand, if the membrane has a thickness larger than about $500\mu$, an increased filtration resistance occurs and the filtering performance may be appreciably deteriorated. Furthermore, the thickness of the microporous membrane 3 can be properly adjusted by the amount and viscosity of the resin suspension applied. It should be also noted that a preferable average pore size of the microporous membrane 3 is between about $0.1\mu$ and about $1\mu$, more preferably, not exceeding $0.5\mu$. Micropores of an average size smaller than about $0.1\mu$ are not preferable owing to their high filtration resistance as well as markedly increased blinding or blocking. If the average pore size exceeds about $1\mu$, a great variance of pore size tends to result, which is inadequate for the filtration of minute particles. Moreover, the average pore size of the microporous membrane may be properly controlled by the resin employed as well as conditions for the heat-treatment, such as the temperature, heating time, etc.

The resinous material used is not only restricted to a fluorocarbon resin but also another high polymeric resin such as polypropylene resin, polyvinylchloride resin and the like can be applied. Namely, in the case where the polypropylene resin or polyvinylchloride resin having a melting point temperature lower than that of the aforementioned fluorocarbon resin is employed, a satisfactory result will be obtained only by adequately changing the heat-melting temperature according to the resin employed. By heating the polypropylene resin at 220°–250° C. or the polyvinylchloride resin at 130°–150° C., for at least 1 hour to melt them to form them into a membrane, allows a part of the resins to permeate the surface layer of the substrate, in accordance with a process similar to the foregoing example regarding the fluorocarbon resin membrane. The solvent used for preparing the resin suspension may be made of solvents which are incapable of dissolving resins and have a good wettability with ceramics. For polypropylene and polyvinylchloride, an organic solvent such as toluene, ethyl acetate, monochlorobenzene and the like can be used. A microporous membrane comprising polypropylene resin or polyvinylchloride resin can attain satisfactory results similar to that comprising fluorocarbon resin.

EXAMPLE 1

The inventor, in accordance with the above-described manufacturing method, applied a suspension of PTFE fine particles (the concentration of solid ingredients of 20% by weight) onto the interior wall surface of a cylindrical substrate formed of an alumina sintered porous body having an average pore size of $0.9\mu$. The suspension was applied in an amount of 100 g/m$^2$, by means of spraying, and thereafter the suspension-applied substrate was dried and heat-treated the at 350° C. for 1 hour to obtain a filter provided with a microporous membrane comprising a fluorocarbon resin and having an average pore size of about $0.1\mu$. As to the resulting filter, the pore size of the microporous membrane of fluorocarbon resin was investigated and found to be about $0.2\mu$ at room temperature and even when the temperature was elevated to 100° C., very little thermal transformation was observed. Further, for both the interior and microporous memebrane surface and the exterior wall surface of ceramic substrate, a separability was measured by a tape-peeling-off method at an angle of 90 degrees and found to be 10 g/1.7 cm for the microporous membrane surface and 300 g/1.7 cm for the ceramic surface. This separability measurement proved the fact that the adhesion to the microporous membrane surface is much lower, so that when the liquid to be filtered is passed outwards from the inside of the cylindrical filter having a microporous membrane on its interior wall surface, then cakes hardly adhere to the microporous membrane surface and thus back-washing is facilitated to maintain a high filtration efficiency.

EXAMPLE 2

According to a method similar to Example 1 above, a suspension which was obtained by adding polypropylene resin fine particles to a solvent of ethyl acetate, etc. followed by agitating (the concentration of solid ingredient of 20% by weight) was applied onto the interior wall surface of a cylindrical substrate formed of an alumina sintered porous body having an average pore size of $0.9\mu$. The suspension was applied in an amount of 100 g/m$^2$, by means of spraying, and thereafter the suspension-applied substrate was dried and heat-treated at 230° C. for about 1 hour to obtain a filter provided with a microporous membrane comprising polypropylene resin and having an average pore size of about $0.1\mu$. As to the resulting filter, the pore size of the microporous membrane of polypropylene resin was investigated and found to be of about $0.2$–$0.3\mu$ at room temperature and the pore size was maintained in the range between $0.21\mu$ and $0.32\mu$ even when the temperature was elevated to 60° C., and very little thermal transformation was observed. Further, for both the interior microporous membrane surface and the exterior wall surface of the ceramic substrate, a separability was measured by a tape-peeling-off method at an angle of 90 degrees and found to be 120–150 g/1.7 cm for the microporous membrane surface and 300 g/1.7 cm for the ceramic surface. The separability measurement proved the fact that the adhesion to membrane surface is much lower, so that when the liquid to be filtered is passed outwards from the inside of the cylindrical filter having a microporous membrane on its interior wall surface, then cakes hardly adhere to the microporous membrane surface and thus back-washing is facilitated to maintain a high filtration efficiency.

EXAMPLE 3

According to a method similar to Example 1 above, a suspension which was obtained by adding polyvinylchloride resin fine particles to a solvent of toluene, etc. followed by agitating (the concentration of solid ingredient of 20% by weight) was applied onto the interior wall surface of a cylindrical substrate formed of an alumina sintered porous body having an average pore size of $0.9\mu$. The suspension was applied in an amount of 100 g/m$^2$, by means of spraying, and thereafter the suspension-applied substrate was dried and heat-treated at 140° C. for about 1 hour to obtain a filter provided with a microporous membrane comprising polyvinylchloride resin and having an average pore size of about $0.1\mu$. As to the resulting filter, the pore size of the microporous membrane of polyvinylchloride resin was investigated and found to be of about $0.08-0.12\mu$ at room temperature and the pore size was maintained in the range between $0.08\mu$ and $0.13\mu$ even when the temperature was elevated to 60° C., and very little thermal transformation was observed. Further, for both the interior microporous membrane surface and the exterior wall surface of the ceramic substrate, a separablility was measured by a tape-peeling-off method at an angle of 90 degrees and found to be 130-180 g/1.7 cm for the microporous membrane surface and 300 g/1.7 cm for the ceramic surface. This separability measurement proved the fact that the adhesion to the membrane surface is much lower, so that when the liquid to be filtered is passed outwards from the inside of the cylindrical filter having a microporous membrane on its interior wall surface, then cakes hardly adhere to the microporous membrane surface and thus back-washing is facilitated to maintain a high filtration efficiency.

The present invention is not limited to the details of the above-described examples and various alterations and modifications may be made therein. For instance, though there was described in the above example a cylindrical substrate comprising a ceramic porous material having on its interior wall surface a microporous membrane comprising a fluorocarbon resin, the microporous membrane may be provided on the exterior wall when the filtrate flows through the wall from outside to inside. The microporous membrane may also be applied on both surfaces of the substrate to ensure reversibility. Further, the substrate may be formed into a plate, thus not being limited to a cylinder.

As is clear from the foregoing description, since in the present invention the surface of the substrate consisting substantially of a ceramic porous material is covered with a microporous membrane consisting substantially of a high polymeric resin, partly permeating the surface layer of the substrate, a sufficiently high mechanical strength attributable to the substrate can be obtained, while the thermal transformation can be minimized to the utmost. Besides, notwithstanding being possible for its pores to be formed in a small enough size, the microporous membrane has a good cake-separability as well as a small filtration resistance, so that filters according to the invention, to which the cake hardly adheres, can be effectively applied for semi-ultrafiltration. Further, the substrate and membrane are excellent in corrosion-resistance and moreover, the microporous membrane has its part permeating the surface so that its adhesive strength to the substrate is extremely high. For reasons of the above according to the present invention, filters can be obtained having excellent corrosion-resistance, durability and heat-resistance, and are capable of repeated use by applying back-washing and are suitable for semi-ultrafiltration defined hereinbefore.

Furthermore, such a filter can be readily produced by a simple process, namely, by application of a high polymeric resin onto the surface of a substrate, followed by heat-treatment.

What is claimed is:

1. A filter comprising:
   a substrate consisting essentially of a ceramic porous material, said ceramic porous material having an average pore diameter of between about 0.5 microns and about 10 microns and having a pore volume of 30–50% based on an apparent volume of the substrate; and
   a microporous membrane consisting essentially of a high polymeric resin having an average pore diameter of about 0.1 microns to about 1 micron, said membrane covering at least one surface of said ceramic porous material to a thickness of about 30–500 microns above said at least one surface and said membrane partly permeating into said ceramic porous material, thereby forming an intermediary layer between said ceramic porous material and said microporous membrane.

2. The filter of claim 1, wherein said high polymeric resin comprises at least one resin selected from the group consisting of fluorocarbon resin, polypropylene resin and polyvinylchloride resin.

3. The filter of claim 1, wherein said ceramic porous material comprises a sintered material.

4. The filter of claim 1, wherein said ceramic porous material comprises a foamed material.

5. The filter of claim 1, wherein the average pore diameter of the microporous membrane does not exceed 0.5 microns.

6. The filter of claim 1, wherein said substrate comprises a cylinder having an inner surface and an outer surface, and said inner surface is covered by said microporous membrane.

7. The filter of claim 1, wherein said substrate comprises a cylinder having an inner surface and an outer surface, and said outer surface is covered by said microporous membrane.

8. The filter of claim 1, wherein said substrate comprises a cylinder having an inner surface and outer surface, and each of said inner and outer surfaces are covered with said microporous membrane.

9. The filter of claim 1, wherein said ceramic porous material comprises alumina.

* * * * *